Oct. 24, 1967 SUKEHIRO ITO 3,349,181
PHASE SHIFT MODULATION RADIO COMMUNICATION SYSTEM
Filed May 8, 1964 3 Sheets-Sheet 1

Inventor
S. ITO
By R. A. Morris
Attorney

Inventor
S. ITO
By [signature]
Attorney

PHASE SHIFT MODULATION RADIO COMMUNICATION SYSTEM

Filed May 8, 1964

3 Sheets-Sheet 3

Inventor
S. ITO
By R. A. Morris
Attorney

United States Patent Office 3,349,181

Patented Oct. 24, 1967

3,349,181

PHASE SHIFT MODULATION RADIO COMMUNICATION SYSTEM

Sukehiro Ito, Minato-ku, Tokyo, Japan, assignor to Nippon Electric Company, Limited, Tokyo, Japan, a corporation of Japan Filed May 8, 1964, Ser. No. 365,916

Claims priority, application Japan, May 9, 1963, 38/24,675

15 Claims. (Cl. 179—15)

ABSTRACT OF THE DISCLOSURE

A phase shift modulation system comprising a transmitter for changing a first plurality of information signals into a quaternary voltage code, translating the voltage code into a further signal represented by a plurality of phase vectors occupying angular positions between predetermined rectilineal coordinate axes, each phase vector identifying one voltage code element, and transmitting the phase vector further signal as a carrier signal varying in predetermined amounts of frequency, each frequency amount identifying one voltage code element, and a receiver for translating the received FM carrier signal into an IF signal represented by a plurality of phase vectors occupying angular positions between predetermined rectilineal coordinate axes in correspondence with the further signal phase vectors at the transmitter, each IF phase vector identifying one voltage code element, and converting the IF phase vector signal into a second plurality of information signals identical with the first plurality of information signals.

The present invention relates to radio communication apparatus in which phase shift modulation or discontinuous phase modulation is employed, and more particularly to radio communication apparatus which can transmit multichannel information signals such as telephone signals from a plurality of channels or frequency-division-multiplex multichannel telephone information signals.

To date, radio communication systems which transmit high quality frequency-division multiplex supermultichannel telephone signals have generally used frequency modulation transmission since such transmission makes the most effective use of the radio frequency bands. The radio frequency band occupied by multichannel telephone signals having a certain number of channels can be made narrower by frequency modulation than by other modulation techniques particularly if single side-band frequency division multiplication is to be utilized. However, should this frequency modulation be adopted, other problems such as noise and distortions must be solved. Such problems are cumulative for each consecutive relay stage. Thus, when the number of relay stages of a relay transmission line increases, high quality transmission is not always obtained. Moreover, when such a communication system is used it is necessary to severely regulate and maintain transmitter-receiver characteristics such as amplitude-frequency characteristics; the delay time-frequency characteristics; the amplitude-phase characteristics etc. which vary with the number of multiplied channels. Therefore, the manufacturing cost of such a transmitter-receiver increases with the number of said channels. In order to further decrease the occupied frequency bandwidth of the radio frequency band, communication apparatus has been proposed which would provide phase-inversion-modulation of a carrier wave by binary information signals which may take the form of time division multiplex PCM signals etc. In this kind of communication apparatus, however, defects in the transmission lines such as instantaneous interruption thereof and the like can produce substantial adverse effects as will be mentioned later. Therefore, this solution is also not preferred. Nevertheless, it should be noted, the last mentioned communication apparatus, does not suffer from the previously-mentioned disadvantage of frequency modulation communication apparatus, that is, that noises or distortions or the like are not added at each multistage relay.

An object of the invention is therefore to provide radio communication apparatus which not only reduces the occupied frequency bandwidth within a radio frequency band but also minimizes the adverse effect of defects in transmission lines.

The radio communication apparatus according to this invention is adapted to transmit information signals (such as multiplex telephone signals which is quantized after being sampled and then quantized after frequency-division multiplied) as different combinations of the four phases of a resultant carrier wave during a unit of time. This is achieved by using two radio frequency carriers, whose phases differ by 90° from each other, that is, by using four phase positions which differ by 90° from each other.

In the radio communication apparatus according to the invention, neither noise nor distortion is accumulated (which as mentioned hereinabove results when conventional communication apparatus is used), even if the number of relay stages increases. In one form of conventional communication apparatuses, each of the two carriers transmits per unit of time every bit of information supplied by two different channels, even when the two carriers differ in phase by 90°. Therefore, when any defects occur in the transmission lines (such as the instantaneous interruption thereof) which last for one unit of time, the adverse effect of such defects extends to the two channels. In the communication apparatus according to the invention, on the other hand, the two carriers which are different in phases by 90° from each other are used as a resultant carrier having four phase positions as a whole. This resultant carrier is caused to transmit per unit of time every two bits of time-division-multiplex information. Therefore, even if a defect in transmission as mentioned above does occur and does last for one unit of time the adverse influence of said fault will extend only to the one channel which is being caused to transmit information bits at the time the fault occurred. In other words, for defects in the transmission line which continue for one unit of time, the adverse effect of such defect can be reduced to half by the communication apparatus provided by this invention.

In the communication apparatus of the invention (although it is possible to transmit information more efficiently by choosing more than five of the phase positions for transmitting quantized or coded information), the most favorable number of the phase positions seems to be about four. This is so because the phase difference between the phase positions decreases with the increasing number of the phase positions. Therefore, although four is not as efficient as five or more phases, it still was practical because this invention provides other advantages such as: increased effectiveness against information loss due to transmission line defects; and the decreased cost of manufacturing the transmitter-receiver. In the present specification, therefore, although the number of phase positions is illustrated as four it should be understood that the invention is also applicable to any number of phase positions.

The above-mentioned and other features and objects of this invention and the means of attaining them will become more apparent and the invention itself will be best understood by reference to the following description of embodiments of the invention taken in conjunction with the accompanying drawings in which.

Figure 1:
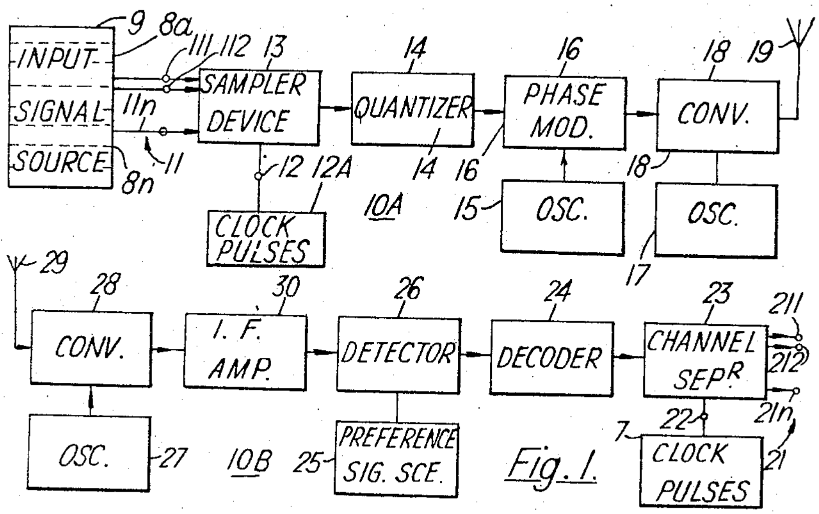
FIG. 1 is a block diagram of an embodiment of the invention.

Now referring to FIG. 1, there is illustrated therein, in block form, the communication apparatus of the invention. This apparatus includes a transmitter 10A at the sending side, which includes input terminals 11 composed of the input terminals 111–11*n* which are connected to a plurality of channels 8*a*–8*n* of input signal source 9 which supplies information such as telephone signals to be transmitted. A sampler 13, which may be a rotary switch or the like and which is supplied with 8 kc. clock pulses from a clock pulse input terminal 12 connected to clock pulse source 12A and converts the information signals from a plurality of said channels into a series of time division multiplex PAM pulses as will be described hereinafter. A quantizer 14 is provided to quantize the series of PAM pulses which are the output of this sampler 13. A frequency stabilized oscillator 15 and a phase modulator 16 are provided and interconnected such that the modulator 16 is supplied with reference phase carrier signals from the frequency stabilized oscillator 15. Modulator 16 is connected to the output of quatizer 14 and produces phase-shift-modulated waves according to the output of the quantizer 14. A transmitting radio frequency oscillator 17 is provided and connected to a transmitting frequency converter 18 which is also connected to receive and convert the frequency of the phase shift modulated wave supplied by modulator 16. A transmitting antenna 19 is connected to transmit the output of converter 18. The receiver communication apparatus of this invention includes a receiver antenna 29 for receiving the signals transmitted by antenna 19. A frequency converter 28 is provided and connected to a local oscillator 27. An intermediate frequency amplifier 30 is connected to receive the output of converter 28. A phase detector 26 which phase-detects the intermediate frequency signal is connected to receive the output of amplifier 30 (as will be described hereinafter). A reference phase signal generator 25 is connected to supply demodulating reference phase signals to the phase detector 26. A decoder 24 is connected to decode the output signal of the phase detector 26. A channel separating circuit 23 is connected to decoder 24 to separate the channels according to the clock pulses supplied from a clock pulse input terminal 22 connected to source 7 into series of PAM pulses (reproduced by decoder 24) which are supplied to output terminal group 21, including output terminals 211–21*n*.

At the transmitter side the information signals such as the telephone signals of channels 8*a*–8*n* are supplied to the input terminal 111–11*n*. These signals are then converted into a series of time division multiplex PAM pulses due to the sampling action of sampler 13. Thereafter, these pulses are formed into a series of coded pulses which are coded in accordance with a quaternary code (or other code) by the quantization action at the quantizer 14. These coded pulses are then converted into phase-shift-modulated-waves that are converted into a combination of the four phases of a subcarrier at the phase modulator 16 and then are transmitted from the transmitting antenna 19 after being frequency converted at the frequency converter 18. On the other hand, on the receiver side, the radio frequency signal received by receiving antenna 29 are frequency-converted at frequency converter 28 into an intermediate frequency signal. These IF signals are formed into a series of quaternary code pulses by the operation of the phase detector 26. Said coded pulses are decoded into an additional series of pulses corresponding with the original series of pulses at the decoder 24, and are then separated and supplied to output terminals 211–21*n*, equal in number to input terminals 111–11*n*, by the channel-separating circuit 23. The output terminals are connected to separate channels (not shown and equal in number to input channels 8*a*–8*n*) at the receiver end.

Figure 2:
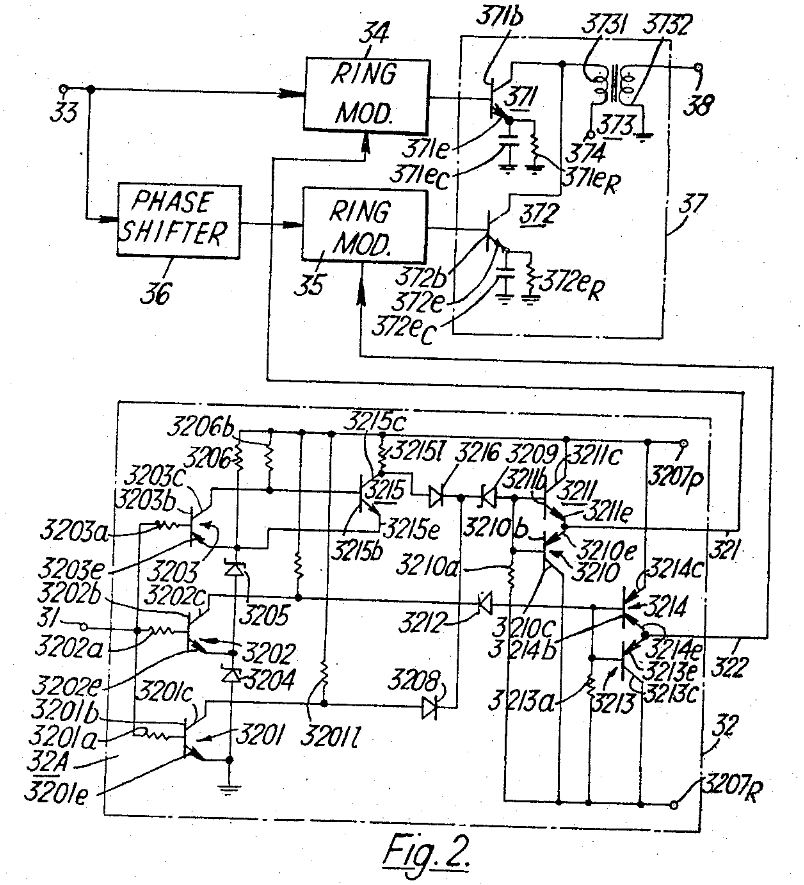
FIG. 2 is a circuit diagram, which illustrates in detail the elements of the main part of the transmitter on the sending side of the block diagram of FIG. 1.

An example of a detailed circuit diagram of the phase shift modulator 16 in the transmitter 10A at the transmitted side is shown in FIG. 2. In FIG. 2, each of the reference numerals common to those in FIG. 1 represents each of the common component elements, respectively. The phase shift modulator 16 includes a signal input terminal 31 which is connected to the output of quantizer 14. A control signal generating circuit 32 in said modulator generates control signals in response to the quantized signal input for transmission on output leads 321 and 322 which will be described hereinafter. A reference phase carrier input terminal 33 is connected to the frequency stabilized oscillator 15. A first ring modulator 34 is connected to this input terminal 33 and is also supplied with the control signal output appearing on the above-mentioned lead 321 which will be mentioned hereinafter in connection with the operation thereof as a phase inverting circuit. A second ring modulator 35 is connected to the input terminal 33 through a 90° phase shifter 36 and is supplied with the control signal output from the above mentioned lead 322 for operating as a phase inverting circuit. A signal combining circuit 37 is provided to combine the outputs of ring modulators 34 and 35; and an output terminal 38 supplies the output signals from signal combining circuit 37 to one input of frequency converter 18.

The control signal generating circuit 32 which is supplied with quantization signals from the input terminal 31 includes a four-values-voltage discriminating circuit 32A which in turn includes transistors 3201, 3202, 3203. The base electrode of each transistor is commonly connected to the input terminal 31 through series resistors 3201*a*, 3202*a* and 3203*a*, respectively. The emitter electrode 3201*e* of the transistor 3201 is grounded. The emitter 3202*e* is connected to the junction of constant-voltage diodes 3204 and 3205 which are connected in series to each other in a bias circuit composed of the diodes 3204 and 3205 and a resistor 3206. The emitter 3203*e* of the transistor 3203 is connected to the junction of the diode 3205 and the resistor 3206 of the biasing circuit. The bias voltage supplied from said bias circuit to transistors 3202 and 3203 is selected to have a value such that (1) when the voltage value of the input quantized signals from the input terminal 31 is 0 volt (representing the code element "0" of a quaternary code) none of these transistors 3201–3203 is caused to generate negative output pulses; (2) that when the voltage value of the input quantized signals from input terminal 31 is $V_1$ volts (representing the code element "1") a negative output pulse is generated only from the transistor 3201; (3) that when the voltage value of the input quantized signals from input terminal 31 is $V_2$ volts (representing the code element "2") negative pulses are produced from both of the transistors 3201 and 3202; (4) and that when the voltage value of the input quantized signals from input terminal 31 is $V_3$ volts (representing the code element "3") negative pulses are produced from all transistors 3201–3203. On the other hand, the collector electrodes 3201*c*–3203*c* of transistors 3201–3203 are respectively connected to a positive power terminal 3207*p* through load resistors 3201*l*–3203*l*, respectively. The collector 3201*c* of the transistor 3201 is connected through a diode 3208 and a constant-voltage diode 3209 to the bases 3210*b* and 3211*b* of the p-type and n-type transistors 3210 and 3211 (in which the bases 3210*b* and 3211*b* and emitters 3210*e* and 3211*e* are coupled respectively to each other). The collector 3210*c* of a transistor 3210 is connected to a negative power source terminal 3207*n* and the collector 3211*c* of the transistor 3211 is connected to a positive power source terminal 3207*p*. The bases 3210*b* and 3211*b* are coupled with each other and are connected to a negative power source terminal 3207*n* through a resistor 3210*a*. Next, the collector 3202*c* of a transistor 3202 is connected through a constant-voltage diode 3212 to the base 3213*b* and 3214*b* of p-type and n-type transistors 3213 and 3214, and in which the bases 3213*b* and 3214*b* and the emitters 3213*e* and 3214*e* are coupled commonly to each other. The collectors 3213*c* and 3214*c* of the transistors 3213 and 3214 are connected to the power source terminals 3207*n* and 3207*p*, respectively. The bases 3213*b* and 3214*b* are also connected to power source terminal 3207*n* through a resistor 3213*a*. The collector 3203*c* of the transistor 3203 is connected to the base 3215*b* of transistor 3215 which is connected in cascade to transistor 3203. The collector 3215*c* of transistor 3215 is connected to the power source terminal 3207*p* through a load resistor 3215*l*. The emitter 3215*e* thereof is connected to the above-mentioned bias circuit at a junction common to the emitter 3203*e* of the transistor 3203. On the other hand, the collector 3215*c* of a transistor 3215 is connected to the constant-voltage diode 3209 through a diode 3216 in common with the diode 3208 connected to the collector 3201*c* of the transistor 3201. The transistor 3215 is inserted so as to supply the transistors 3210 and 3211 with the output pulses of the transistor 3203 after inverting the pulses as will be described hereinafter. To lead 321 is connected the emitters of the above-mentioned transistors 3210 and 3211, which are coupled to each other. The lead 322 is connected to the coupled emitter electrodes of the transistors 3213 and 3214.

The operation of the control signal generating circuit 16 will now be described. If the voltage value of the quantized signal from input terminal 31 is 0 volt (representing a quaternary code element element "0"), no negative output pulse is generated from any of the transistors 3201–3203 of the voltage discriminating circuit 32A. Therefore, positive control signals appear at each of the leads 321 and 322. Next, when the voltage value of quantized signal is $V_1$ volts (representing a quaternary code element "1"), then only the transistor 3201 of the voltage discriminating circuit 32A turns "on." The transistors 3210 and 3211 are supplied with negative output pulses, and consequently, the output control signals on lead 321 are negative. On the other hand, the positive control signals appearing at lead 322 does not vary. Next, when the voltage value of quantization signals $V_2$ volts (representing a quaternary code element "2") two of the transistors 3201 and 3202 of the voltage discriminating circuit 32A turn "on." Therefore, both of the control signals appearing on leads 321 and 322 are negative. Further, when the voltage value of quantization signals is $V_3$ volts (representing a quaternary code element "3") all of the transistors 3201–3203 of the voltage discriminating circuit 32A turn "on." Therefore the transistor 3215 which is connected in cascade to the transistor 3203 turns "off" and consequently the transistors 3210 and 3211 are supplied with positive output pulses and positive control pulses appear on lead 321. On the other hand, since the transistor 3202 is still "on,"' the bases of the transistors 3213 and 3214 are supplied with negative output pulses, therefore, the control pulses appearing at the wiring 322 are negative. In summary, when the input quantized signal is 0 volt representing a code element "0," each of the output control signals appearing at the output leads 321 and 322 is positive. When the input quantized signal is $V_1$ volts representing a code element "1" the output signals on leads 321 and 322 are negative and positive, respectively. When the input quantized signal is $V_2$ volts representing a code element "2," the output signals on leads 321 nad 322 are negative; and when the input quantized signal is $V_3$ volts representing a code element "3" the output signals on leads 321 and 322 are positive and negative, respectively.

On the other hand, the reference phase signals supplied from the frequency stabilized oscillator 15 to the input terminal 33 are supplied to the ring modulator 34 which also receives the control signals from the above-mentioned lead 321 as phase inverting control signals. At the same time, the signals from terminal 33 are supplied through phase shifter 36 to another ring modulator 35 which also receives control signals from another lead 322 as phase inverting control signals. The ring modulators 34 and 35 cause the input reference phase signal to pass therethrough to their respective output terminals without any phase shift when the control signal is positive and to pass with 180° phase shift when the control signal is negative.

The signal combining circuit 37 (which produces a composite signal of the output signals from these ring modulators 34 and 35 supplied to the circuit 37 as input signals thereof) comprises transistors 371 and 372. The outputs of the ring modulators 34 and 35 are applied to the base electrodes 371*b* and 372*b* of said transistors which are suitably voltage-biased by a bias circuit (not shown). The emitter electrode 371*e* of transistor 371 is grounded through parallel connected resistor 371*e*R and capacitor 371*e*C.

The emitter 372*e* of the transistor 372 is grounded through parallel connected resistor 372*e*R and capacitor 372*e*C. The collectors 371*c* and 372*c* of said transistors are both connected to the same end of primary winding 3731. A positive power source terminal 374 is connected to another side of the output transformer 373. One side of the secondary winding 3732 of said output transformer 373 is grounded, and the other side thereof is connected to an output terminal 38.

As is clear from this arrangement of the signal combining circuit 37, the input signals applied to the bases of transistors 371 and 372 are combined at the output transformer 373 and are derived as a composite signal at the output terminal 38 which is connected to the transmitting frequency converter 18 of FIG. 1.

Figure 3:
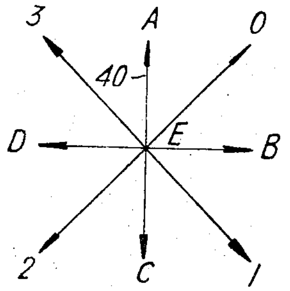
FIGS. 3 and 4 are vector diagrams which will help explain the operation of the transmitter shown in FIG. 2.

Now referring to FIG. 3 which is a vector diagram illustrating the phases of the reference phase signal from the frequency stabilized oscillator 15. If 0° is represented by a phase vector 40 the phase of the input signal to the ring modulator 34 is represented by a vector $\overline{EA}$ in the same phase as this vector 40. On the other hand, the phase of the input signal to the ring modulator 35 is delayed by 90° as represented with a vector $\overline{EB}$ which is delayed with respect to the vector $\overline{EA}$. This delay is due to the phase shift action of the phase shifter 36. Now, if the voltage value of the quantized signal supplied to the quantized signal input terminal 31 is 0 volt (representing the quaternary code element "0"), the output pulses appearing on leads 321 and 322 are positive and no phase inverting action occurs at the ring modulators 34 and 35. Therefore the input to the ring modulator 34 represented by the vector $\overline{EA}$ and the input to the ring modulator 35 represented by the vector $\overline{EB}$ are combined at a signal compositor 37, and a composite output signal represented by a vector $\overline{EO}$ having a phase position of 45° appears at the output terminal 38. Next, if the voltage value of the quantized signal is $V_1$ volt (representing the code element "1") only the control signal output pulses which are supplied from lead 321 to the ring modulator 34 become negative as described above. An output signal is generated which is represented by a vector $\overline{EC}$ by phase-converting the input signal to the ring modulator 34 represented by the vector $\overline{EA}$. Therefore, at the output terminal 38, an output signal appears represented by a vector $\overline{EI}$ which is phase delayed by 90° with respect to the vector $\overline{EO}$. Next, if the voltage value of quantization signal is $V_2$ volts (representing the code element "2") both of the control signals from leads 321 and 322 become negative. Therefore, at each of the ring modulators 34 and 35 phase inverting action is carried out. Consequently, the phases of the output signals of these ring modulators 34 and 35 are represented by $\overline{EC}$ and $\overline{ED}$, respectively, and the resultant vector output signal is represented by a vector $\overline{E2}$ which is phase delayed by 180° as compared with the vector $\overline{EO}$. Next, if the voltage value of the quantized signal is $V_3$ volts representing the code element "3", the control signal from leads 321 and 322 become positive and negative, respectively. Therefore, the phase inversion action is performed only at the ring modulator 35 so that the input vector $\overline{EB}$ is 180° shifted and becomes vector $\overline{ED}$. Consequently, a resultant output signal represented by a vector $\overline{E3}$ appears at the output terminal 38 and is delayed by 270° as compared with vector $\overline{EO}$.

As described above, when the quantized signals supplied from the quantizer 14 to the input terminal 31 take the voltage values of 0, $V_1$, $V_2$ and $V_3$ (representing code elements "0," "1," "2" and "3," respectively,) the phases of the resultant output signals which appear at the output terminal 38 assume phase position of 45°, 45°+90°, 45°+180° and 45°+270° from the phase position corresponding to the reference phase signals.

Figure 4:
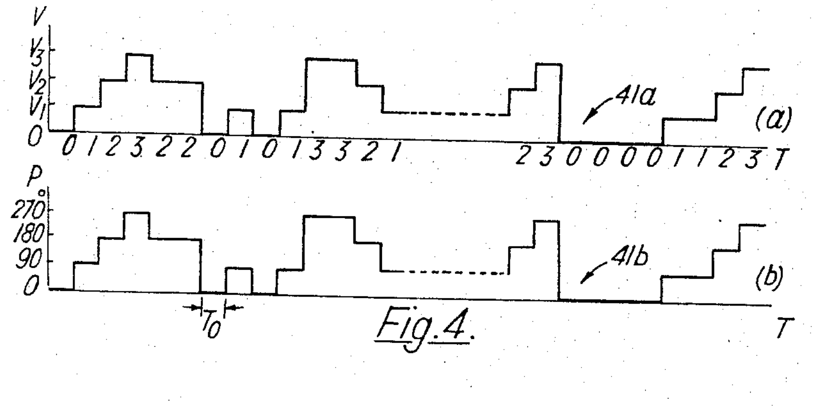

The conversion of voltage coded pulses to phase coded pulses is illustrated in FIGS. 4(*a*) and (*b*). In FIG. 4, the abscissa axis indicates time. In FIG. 4(*a*) the ordinate axis indicates voltages whereas the ordinate axis of FIG. 4(*b*) indicates phase.

In FIG. 4 if the number of multiplex voice channels is *n*, then one additional channel is provided for keeping synchronism between the sending and receiving-end apparatus. Furthermore, if in FIG. 4 the information signals of each channel are respectively coded into a quaternary code, and if phase shift modulation at the phase modulator 16 is carried out so that the modulated resultant output signal assume the phase position of 45°, 45°+90°, 45°+180° and 45°+270° (corresponding to the voltage values of 0, $V_1$, $V_2$ and $V_3$ volts of input quantized signals) then a series of input pulses shown as 41*a* in FIG. 4(*a*) is composed of voltage code values "012322C1C13321 . . . 2300001123" of which this voltage code is converted into a modulated wave form 41(*b*) indicated in FIG. 4(*b*). As indicated in FIGS. 4(*a*) and (*b*), a code from the $n+1^{th}$ channel or the zeroth channel succeeding the $n^{th}$ channel can provide the quaternary code "0000" which can be used for the purpose of frame synchronism between both the transmitter and the receiver apparatus not shown but to be described later in brief. Inasmuch as the sampling of each channel signal at the transmitter is usually carried out at 8 kc. of sampling frequency, the time to be assigned to a code, that is, a unit coding time *To*, is in the case of the exemplified coding into a quaternary code of four figures $$(1/n)\times(1/4)\times(1/8)\times10^{-3}\text{ sec.}$$

where *n* is the number of channels of multichannel telephony.

A reference phase signal which has been discontinuously phase-modulated or phase-shifted-modulated is frequency-converted into a radio frequency at a transmitting frequency converter and is sent to the transmitting antenna 19.

The radio frequency signal received by the receiver antenna 29 in the receiver 10*b* of FIG. 1 is frequency-converted into an intermediate frequency signal at the frequency converter 28, and then amplified at the intermediate frequency amplifier 30. The amplified signal is then supplied to the phase detector 26.

Figure 5:
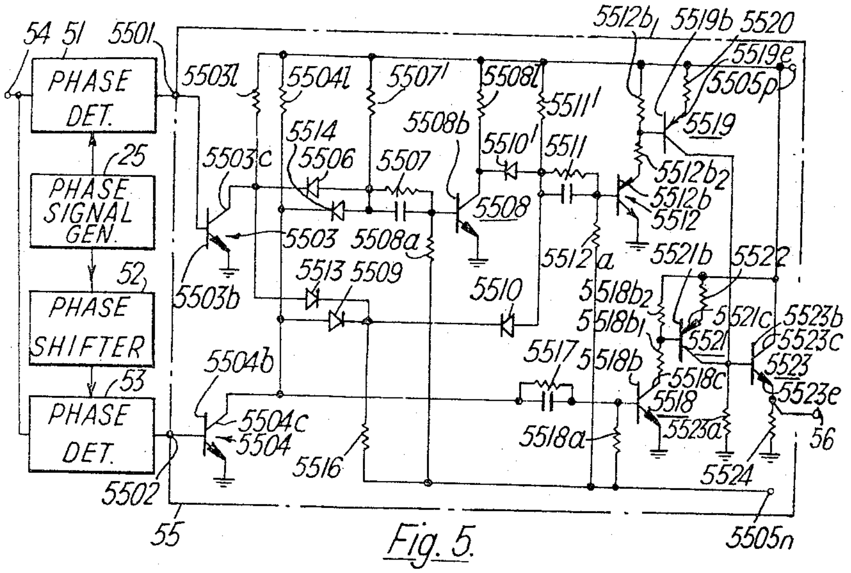
FIG. 5 is a circuit diagram, which shows in detail the elements of the main part of the receiver at the receiving side of the block diagram of FIG. 1.

An example of a detailed circuit diagram of the above-mentioned phase detector 26 in the receiver 10*b* is shown in FIG. 5 which partially includes well-known circuitry represented as blocks. In FIG. 5, like reference numerals common with the block diagram of FIG. 1 represent the same component elements. Detector 26 of FIG. 5 comprises a synchronized phase detector 51 which is supplied directly with the reference phase signals from the demodulating reference phase signal generator 25. Another synchronized phase detector 53 is supplied with the same reference phase signal from generator 25 through a 90° phase shifter 52. An intermediate frequency signal input terminal 54 is connected to the phase detectors 51 and 53 to supply intermediate frequency signals in parallel to said detectors. A code converting circuit 55 showing decoder 24 in detail is supplied with phase detected signals from detectors 51 and 53 for code-converting the detected signals into a quaternary code signal (or other suitable code signals) having a code form which is convenient for decoding. An output terminal 56 is attached to the output side of the code converting circuit 55.

The code converting circuit 55 is supplied with the output signals of the synchronized phase detectors 51 and 53 from input terminals 5501 and 5502. Circuit 55 includes transistors 5503 and 5504 whose base electrodes 5503*b* and 5504*b* are connected respectively to said input terminals and emitter electrodes 5503*e* and 5504*e* are respectively grounded. The collectors 5503*c* and 5504*c* of transistors 5503 and 5504, respectively, are connected to a positive power source terminal 5505*p* via load resistors 5503*l* and 5504*l*, respectively. In addition, the collector 5503*c* of the transistor 5503 is connected to the base 5508*b* of a transistor 5508 through a diode 5506 and a CR parallel circuit 5507. As indicated in FIG. 5, one terminal of the CR parallel circuit 5507 is connected to the terminal 5505*p* through a resistor 5507′. The base electrode 5508*b* is also connected to a negative power source terminal 5505*n* through a bias resistance 5508*a*. Collector 5508*c* is connected to the positive power source terminal 5505*p* through a load resistance 5508*l*, and at the same time, is connected to the base electrode 5512*b* of a transistor 5512 (to be described in more detail hereinafter) through a diode 5510′ and a CR parallel circuit 5511. The junction point of the diode 5510′ and the CR parallel circuit 5511 is connected to the positive power source terminal 5505*p* through a resistor 5511′. In addition, the collector 5504*c* of the transistor 5504 is connected to the base 5512*b* of a transistor 5512 through diodes 5509 and 5510 and the CR parallel circuit 5511. The base electrode 5512*b* of transistor 5512 is connected to a negative power terminal 5505*n* through a resistor 5512*a*. The collector electrode 5503*c* of transistor 5503 is connected to the above-mentioned junction of the diodes 5509 and 5510 through a diode 5513. The collector electrode 5504*c* of the transistor 5504 is connected to the above-mentioned junction point of the diode 5506 and the CR parallel circuit 5507 through diode 5514. Of these junction points, the former is connected to the negative power source terminal 5505*n* through resistor 5516 and the latter is connected to the positive power source terminal 5505*p* through a resistor 5507′, respectively. Also, the collector 5504*c* of the transistor 5504 is connected to the base electrode 5518*b* of transistor 5518 through a CR parallel circuit 5517. The base electrode 5518*b* is connected to the negative power source terminal 5505*n* through a resistor 5518*a*. The collector 5512*c* of transistor 5512 is connected to the positive power source terminal 5505*p* through resistors 5512*b*$_1$, and 5512*b*$_2$ and the junction of these resistors is connected to the base electrode 5519*b* of transistor 5519. The emitter electrode 5519*e* of transistor 5519 is connected to the positive power source terminal 5505*p* through an emitter resistance 5520. Also, the collector electrode 5518*c* of transistor 5518 is connected to the above-mentioned power terminal 5505*p* through a series circuit composed of resistors 5518*b*, and while the junction of these resistors is connected to the base electrode 5521*b* of transistor 5521. The emitter electrode 5521*e* of transistor 5521 is also connected to the positive power terminal 5505*p* through a resistor 5522 inserted into the emitter circuit. The collector electrode 5521*c* is connected to the base electrode 5523*b* of transistor 5523 which constitutes an emitter follower amplifier in the succeeding stage. This base electrode 5523*b* is grounded through a resistance 5523*a* and the collector 5523*c* is connected to the positive power source terminal 5505*p*. The emitter electrode 5523*e* of transistor 5523 is grounded through resistor 5524. An output terminal 56 is connected to a point common to emitter 5523*e* and register 5524 so that an output can be derived from both the ends of resistor 5524. Also, the collector 5519*c* of transistor 5519 is connected to the base electrode 5523*b* of the emitter follower amplifier 5523.

The operation of the code converting circuit 55 will now be described. If the intermediate frequency signal supplied from the signal input terminal 54 is a signal representing the vector $\overline{EO}$ in FIG. 3, both of the output signals of the synchronous phase detectors 51 and 53 are positive. Therefore, transistors 5503 and 5504 turn "on." Consequently, diodes 5506 and 5514 are biassed in the conductive direction so that transistor 5508 turns "off." On the other hand, since transistor 5504 is "on," a negative pulse applied through diodes 5509 and 5510 and the CR parallel circuit 5511 causes the transistors 5519 and 5512 to turn "off." Moreover, due to the negative pulse applied through the CR parallel circuit 5517, transistor 5518 turns "off." Consequently, transistor 5521 turns "off" with the result that current does not pass through resistor 5523*a*. At the output terminal 56 connected to the transistor 5523, an output voltage of zero volt appears and represents a quaternary code element "0."

Next, if the intermediate frequency signal is a signal representing the vector $\overline{E1}$, of FIG. 3, the outputs of the synchronous phase detectors 51 and 53 are negative and positive, respectively. Therefore, the transistors 5503 and 5504 turn "off" and "on," respectively. Consequently, diodes 5514 and 5513 are biassed in the conductive direction. The transistor 5508 turns "off" and the transistor 5512 turns "on." On the other hand, inasmuch as the output of the detecting circuit 53 is positive, the transistor 5504 turns "on," which turns transistor 5518 "off." Consequently, transistor 5521 turns "off." Thus the value of current $I_1$, which passes through the resistance 5523*a* inserted into the base circuit of the transistor 5523, is determined according to the resistance of the resistors 5512*$b_1$*, 5512*$b_2$* and 5520, and consequently the product of this current $I_1$ and the resistance value R of the resistor 5523*a* (that is $R \times I_1$) becomes the voltage $R \times I_1 = V_1$ volts representing a code element "1." The output voltage appearing at the output terminal 56 is approximately $V_1$ volts.

In like manner, if an input intermediate frequency signal is a signal representing the vector $\overline{E2}$, a voltage representing a code element "2," that is, a voltage of about $2RI_1 = V_2$ volts, appears at the output terminal 56. If the input signal represents the vector $E_3$, a voltage representing a code element "3," that is, a voltage of about $3RI_1 = V_3$ volts, appears at output terminal 56.

As described in the foregoing, an information signal such as a time division multiplex multichannel telephony signal is processed in suitable equipment after being discontinuously phase-modulated and demodulated.

In the above-mentioned embodiment, although it is assumed that the information signal to be transmitted is a time division multiplex quantized signal as shown in FIG. 4, it is obvious that the signal to be transmitted with the communication apparatus according to the invention is not restricted to such signal.

Figure 6:
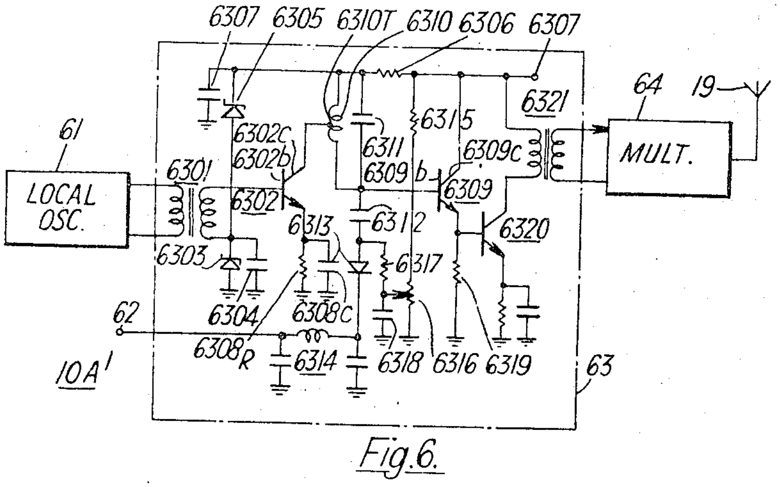
FIG. 6 is another embodiment of the above-mentioned transmitter on the sending side of the block diagram of FIG. 1.

Another embodiment of the transmitting apparatus at the transmitter side 10A of FIG. 1 will now be described with reference to the circuit diagram of FIG. 6 which partially includes well-known circuitry represented by blocks. In the circuit of FIG. 6, the same reference numerals common to FIG. 1 represent common component elements respectively. This transmitting apparatus 10A' of FIG. 6 includes a local oscillator 61 which generates intermediate frequency carrier signals. A phase modulator 63 is supplied with the quantized signals from the quantizer 14 of FIG. 1 at an input terminal 62. A frequency multiplier 64 and a transmitting antenna 19 are also provided. The phase modulator 63 comprises an input transformer 6301 whose primary winding is supplied with the intermediate frequency carrier signals from the above-mentioned local oscillator 61. The base electrode 6302*b* of transistor 6302 is connected to an end of the secondary side winding of transformer 6301. The other end of the secondary winding of transformer 6301 is grounded through a parallel circuit composed of a constant voltage diode 6303 and a capacitor 6304 and at the same time is connected to a positive power source terminal 6307 through a constant-voltage diode 6305 and a resistor 6306. Also, the emitter electrode 6302*e* of transistor 6302 is grounded through resistor 6308R and capacitor 6308C which constitutes a CR parallel circuit for biasing. Further, the collector electrode 6302C is connected to the intermediate tap 6310T of a coil 6310. In addition, one end of the coil 6310 is connected to the junction of the above-mentioned constant-voltage diode 6305, capacitor 6311 and the resistor 6306, and at the same time the terminal of its other end is connected to the base electrode 6309*b* of transistor 6309 which constitutes a transistor amplifier in the succeeding stage. The terminal of the above-mentioned other end of coil 6310 is connected to the quantized input terminal 62 through a capacitor 6312, a variable capacity diode 6313 and a low-pass filter 6314. Between the power source terminal 6307 and the earth, a series circuit formed by a resistor 6315 and a variable resistor 6316 is inserted and the slidable tap of the variable resistor 6316 is connected to the junction of the above-mentioned variable capacity diode 6313 and the capacitor 6312 through a resistor 6317. The above-mentioned transistor 6309 is made an emitter follower amplifier by connecting its collector electrode 6309*c* to the above-mentioned power source terminal 6307 and its emitter 6309*e* through register 6319 to ground. The output is derived from both ends of resistor 6319. The output derived from the emiter 6309*e* of transistor 6309 is connected to the base of transistor 6320 which constitutes an amplifier connected to the succeeding frequency multiplier 64 through output transformer 6321.

The operation of the phase shift modulator 63 of FIG. 6 will now be described. The transistor 6302, associated with the coil 6310, the capacitor 6311 and the variable capacity diode 6313, constitute a turned amplifier which is turned to the frequency of the above-mentioned intermediate frequency carrier and its output signal is phase shift modulated in response to the minute variation of the capacity of a variable capacity diode according to the voltage value of the quantized signal supplied from the quantized signal input terminal 62. In other words, when quantization signals from the input terminal 62 have the voltage values of 0, $V_1$, $V_2$ and $V_3$ (representing quaternary code elements "0," "1," "2" and "3," respectively) the capacity of variable capacity diode 6313 varies with these voltage values. Thus, the resonance frequency of the tuning circuit of the above-identified tuned amplifier varies. Consequently, phase shift modulation is carried out in this amplifier. The degree of phase deviation modulation is determined in the following manner. When, for example, the frequency of the above-mentioned intermediate frequency carrier is selected at 31.25 mc., and the frequency of the carrier transmitted from the sending antenna is selected at 2000 mc. the multiplication factor at the frequency multiplier 64 becomes 64 times. Thus, the multiplier 64 may be composed of six stages of frequency doubler circuits. Thus, inasmuch as the multiplication factor in a frequency multiplier is large, the phase shift modulation at the transistor 6302 constituting the turned amplifier is sufficiently carried out so that the phase difference to each voltage value of quantized signal becomes 90°/64, that is, 1.41°. As the degree of phase shift modulation at the tuned amplifier is very small, it is essential that the oscillating frequency of the local oscillator 61 be extremely stable. This oscillator may suitably be a crystal controlled oscillator.

As described in the transmitting apparatus 10A' of FIGURE 6 a minute degree of phase shift modulation may be performed at the stage of intermediate frequency carrier signal. Thereafter, the modulated intermediate frequency carrier may be frequency multiplied to obtain a desired modulated radio frequency carrier.

It is apparent that the embodiment described in the preceding paragraphs does not detail how synchronization of the transmitter and receiver is achieved. Nonetheless the method of phase synchronization for synchronizing the reference phase of the reference phase signal at the receiver side with the reference phase of the reference phase signal at the transmitter side is well known. One known method for synchronizing frequency-multiplication and frequency-division system which has been used in the field of telegraph signal transmitting apparatus utilizes phase shift modulation and which is described in U.S. Patent No. 2,491,810. Such a method can also be used for this invention.

While I have described above the principles of my invention in connection with specific embodiments, it is to be clearly understood that this description is made only by way of example, and not as a limitation to the scope of my invention as set forth in the objects thereof and in the accompanying claims.

What is claimed is:

1. A phase shift modulation radio communication transmitter comprising:
- a source of information signals;
- transmitter means connected to said information signal source, said transmitter means including:
  - coding means for converting said signals into a multi-element code comprising a preselected number of discrete voltages of predetermined values, each voltage value constituting one code element;
  - means for converting said voltage code into a phase shifted further signal represented by a plurality of phase vectors having a number equal to said preselected number of voltage code elements and occupying angular positions between predetermined rectilineal coordinate axes, each further signal phase vector occupying an angular position between a predetermined two of said coordinate axes for representing one voltage code element;
  - and means for transmitting a carrier signal varying a preselected characteristic in a plurality of predetermined amounts in response to said further signal represented by said phase vectors, said carrier signal varying said preselected characteristic in each predetermined amount in response to said further signal represented by each of said phase vectors in turn for representating each of said voltage code elements in turn.

2. A phase shift modulation radio communication transmitter as set forth in claim 1 wherein the said coding means converts said information signals into a multi-element voltage code comprising a quaternary type, said quaternary code converting means converts said quaternary voltage code into said phase shifted further signal represented by four phase vectors occupying angular positions of 45° between predetermined rectilineal coordinate axes, each further signal phase vector occupying an angular position of 45° between a predetermined two of said coordinate axes for representing one quaternary voltage code element, and said transmitting means transmits said carrier signal varying said preselected characteristic in a plurality of predetermined amounts in response to said further signal represented by said 45° phase vectors, said carrier signal varying said preselected characteristic in each predetermined amount in response to said further signal represented by each 45° phase vector in turn for representing each element of said quaternary voltage code in turn.

3. A phase shift modulation radio communication transmitter as set forth in claim 2 wherein said quaternary code converting means includes
- means for generating a signal of reference phase;
- and means for modulating two different portions of each voltage element of said quaternary voltage code in turn and two different portions of said reference phase signal, one of said last-mentioned portions separated 90° from the other of said last-mentioned portions, to provide said phase shifted further signal represented by said four phase vectors occupying said 45° angular positions between said predetermined rectilineal coordinate axes.

4. A phase shift modulation radio communication system comprising:
- a source of information signals;
- transmitter means connected to said information signal source, said transmitter means including:
  - coding means for converting said signals into a multi-element code comprising a preselected number of discrete voltages of predetermined values, each voltage value constituting one voltage code element;
  - means for converting said multi-element voltage code into a phase shifted further signal represented by a plurality of phase vectors having a number equal to said preselected number of said voltage code-elements and occupying angular positions between predetermined rectilineal coordinate axes, each further signal phase vector occupying an angular position between a predetermined two of said coordinate axes for representing one of said voltage code elements;
  - and means for transmitting a carrier signal varying a preselected characteristic in predetermined amounts in response to said further signal represented by said phase vectors, said carrier signal varying said preselected characteristics in each predetermined amount in response to said further signal represented by each of said phase vector in turn for representing each of said voltage code elements in turn:
- receiver means including
  - means for receiving said transmitted carrier signal;
  - means for converting said received carrier signal into a phase shifted intermediate frequency signal represented by a plurality of other phase vectors occupying angular positions between predetermined rectilineal coordinate axes in correspondence with said angular positions of said phase vectors representing said phase shifted further signal, each intermediate frequency signal phase vector corresponding with one further signal phase vector and thereby representing one voltage code element;
  - and means for translating said phase shifted intermediate frequency signal represented by said phase vectors into additional information signals corresponding with said first-mentioned information signals.

5. A phase shift modulation radio communication system as set forth in claim 4 wherein
- said information signal source comprises a plurality of telephone channels for supplying said first-mentioned information signals;

said coding means includes means for sampling said first-mentioned information signals derived from said telephone channels to provide time division multiplex pulses;

means for converting said multiplex pulses into said multi-element voltage code;

and means for translating last-mentioned multi-element voltage code into control voltages consisting of a plurality of pairs of discrete voltages having predetermined polarities, each control voltage pair of predetermined polarities representing one voltage element of said last-mentioned voltage code;

and said code converting means comprises means for translating said control voltage pairs in turn into said phase shifted further signal represented by said phase vectors, each further signal phase vector representing one of said control voltage pairs.

6. A phase shift modulation radio communication system as set forth in claim 5 wherein said last-mentioned control voltage pair translating means includes a generator for providing a signal of a reference phase;

a first modulator for translating a first portion of said phase reference signal and one of said control voltages of each of said control voltage pairs in turn into a phase shifted second signal represented by phase vectors occupying angular positions coincident with the ordinate of said predetermined rectilineal coordinate axes as determined by the polarities of the last-mentioned one control voltages in turn;

a second modulator for translating a second portion of said reference phase signal delayed by 90° and another of said control voltages of said control voltage pairs including said one control voltages in turn into a phase shifted third signal represented by phase vectors occupying angular positions coincident with the abscissa of said predetermined rectilineal coordinate axes as determined by the polarities of said last-mentioned other control voltages in turn so that pairs of said phase shifted second and third signals represented by phase vectors coincident with said ordinate and abscissa of said coordinate axes and corresponding with successive pairs of said control voltages are separated by 90°;

and means for combining said successive pairs of said phase shifted second and third signals to form said phase shifted further signal represented by said first-mentioned phase vectors.

7. A phase shift modulation communication system as set forth in claim 3 wherein said intermediate frequency signal translating means includes phase detecting means including a generator of a signal providing a reference phase;

a first detector for translating a first portion of said reference signal and a first portion of said intermediate frequency signal represented by said second-mentioned phase vectors in turn into a first series of discrete voltages having predetermined polarities;

and a second detector for translating a second portion of said reference phase signal delayed by a 90-degree phase shift and a second portion of said intermediate frequency signal represented by said second-mentioned phase vectors in turn into a second series of discrete voltages having predetermined polarities and corresponding in time with said first first series of discrete voltages;

so that a simultaneous combination of one voltage of the successive voltages of said first first voltage series and a corresponding one voltage of the successive voltages of said second voltage series represents each of said intermediate frequency signal phase vectors in turn and thereby represents each element of said transmitter multi-element code in turn;

and means for decoding said last-mentioned simultaneous combinations of one voltages of said first and second voltage series to provide said additional information signals.

8. A phase shift modulation radio communication system according to claim 7 wherein said decoding means includes means for translating said last-mentioned simultaneous one voltage combinations into additional voltages having predetermined values corresponding with said first-mentioned predetermined values of said multi-element code elements, each of said additional voltages representing one element of said multi-element code;

and means for translating said last-mentioned additional voltages into said additional information signals.

9. A phase shift modulation radio communication system according to claim 8 wherein said transmitter means includes first timing means for translating said first-mentioned information signals into first time division pulses, and said first-mentioned converting means converts said first time division pulses into said first-mentioned multi-element voltage code;

and said last-mentioned additional voltage translating means includes second timing means for translating said last-mentioned additional voltages into second time division pulses corresponding in time with said first mentioned time division pulses, and means for separating said second time division pulses into said addition information signals.

10. A phase shift modulation radio communication transmitter comprising:

a source of information signals;

means for translating said signals into time division pulses;

means for translating said pulses into a multi-element code formed by a preselected number of discrete voltages having predetermined values, each voltage value identifying one code element;

means activated by each of said code voltages in turn to produce a series of pairs of discrete voltages, each voltage of each control voltage pair having a predetermined polarity and each control voltage pair identifying one of said code elements;

means for producing a signal of reference phase;

first modulating means activated by one voltage of each of said pairs of control voltages in turn and a first portion of said reference phase signal to provide a first phase shifted signal represented by a plurality of phase vectors occupying angular positions coincident with a predetermined one axis of two rectilineal coordinate axes as fixed by the polarity of said last-mentioned one voltage of said control voltage pairs in turn;

second modulating means activated by another control voltage of each of said control voltage pairs in turn, said one and other control voltages forming the same voltage pair in said control voltage pairs in turn, and a second portion of said reference phase signal delayed by 90° from said first reference phase signal portion to provide a second phase shifted signal represented by a plurality of phase vectors occupying angular positions coincident with predetermined other axis of said two rectilineal coordinate axes as fixed by the polarity of said last-mentioned other voltage of said control voltage pairs in turn;

means for combining said first and second phase shifted signals derived from said same voltage pair of said control voltage pairs in turn and separated by 90° to provide a phase shifted further signal represented by a plurality of resultant phase vectors occupying angular positions between said predetermined one and other axes of said coordinate axes, said last-mentioned resultant phase vectors having a number equal to said preselected number of voltage code elements and each of said last-mentioned resultant phase vectors identifying one of said voltage code elements;

means for producing a signal of carrier frequency;

and means activated by said carrier signal and further signal represented by each of said resultant phase vectors in turn to transmit said carrier signal varying in predetermined amounts of frequency, said carrier signal frequency varying in each predetermined amount in response to said further signal represented by each of said last-mentioned resultant phase vectors in turn for identifying each of said voltage code elements in turn.

11. A phase shift modulation radio communication receiver for an incoming first code signal varying in a preselected characteristic in predetermined amounts in response to a second code signal represented by a plurality of phase vectors occupying angular positions between predetermined rectilineal coordinate axes, comprising:

means for receiving said incoming first code signal;

means for converting said incoming first code signal into an intermediate frequency signal represented by a plurality of other phase vectors occupying angular positions between predetermined rectilineal coordinate axes in correspondence with said angular positions between said predetermined rectilineal coordinate axes of said second code signal phase vectors;

a generator for providing a signal of reference phase;

first phase detecting means for converting a first portion of said reference phase signal and a first portion of said intermediate frequency signal represented by each of said other phase vectors in turn into a first series of discrete voltages having predetermined polarities;

second phase detecting means for converting a second portion of said reference phase signal delayed by 90° from said last-mentioned first portion of said reference phase signal and a second portion of said intermediate frequency signal represented by each of said other phase vectors in turn into a second series of discrete voltages having predetermined polarities and corresponding in time with said first voltage signal series so that a combination into the same pair of one voltage of the successive voltages of said first voltage series and a corresponding one voltage of the successive voltages of said second voltage series in turn identifies said intermediate frequency signal represented by each of said other phase vectors in turn in correspondence with said second code signal represented by said first-mentioned phase vectors in turn;

means for translating each of said last-mentioned one voltage signal combinations in turn into one of a plurality of additional voltages of predetermined values in turn to represent each of said intermediate frequency signal phase vectors in turn;

clock means for converting said last-mentioned additional voltages into time division pulses;

and means for separating said time division pulses into information signals.

12. A phase shift modulation radio communication system comprising:

a transmitter including a source of information signals;

means for translating said signals into time division pulses;

means for translating said pulses into a preselected code constituted by a certain number of discrete voltages having predetermined values, each voltage value identifying one code element;

means activated by said code voltages to produce a series of pairs of discrete control voltages, each voltage of each control voltage pair having a predetermined polarity and each control voltage pair identifying one of said code elements;

a first oscillator for producing a signal of reference phase, a first modulator activated by one control voltage of each of said pairs of control voltages in turn and a first portion of said first reference phase signal to provide a first phase shifted signal represented by a plurality of phase vectors occupying angular positions coincident with a predetermined one axis of two rectilineal coordinate axes as fixed by the polarity of said last-mentioned one control voltage of the successive pairs of control voltages, a second modulator activated by a second control voltage of each of said pairs of control voltages, said one and second control voltages forming the same pair of said respective pairs of control voltages, and a second portion of said first reference phase signal delayed by 90° from said first portion of said first reference signal to provide a second phase shifted signal represented by a plurality of phase vectors occupying angular positions coincident with a predetermined other axis of said two coordinate axes as fixed by the polarity of said last-mentioned second control voltage of the successive pairs of control voltages so that said first and second phase shifted signals represented by said phase vectors coincident with said predetermined one and other coordinate axes are separated by 90°;

means for combining said first and second phase shifted signals represented by phase vectors derived from said one and second control voltages of said control voltage pairs in turn and separated by 90° to provide a further signal represented by a plurality of resultant phase vectors occupying angular positions between said predetermined one and other axes of said coordinate axes and comprising a number equal to said certain number of preselected code elements, each of said further signal vectors representing one of said voltage code elements;

a second oscillator for producing a signal of carrier frequency;

and means responsive to said carrier signal and each of said further signal phase vectors in turn for transmitting said carrier signal varying in frequency in predetermined amounts in response to said further signal resultant phase vectors in turn, each of said carrier signal predetermined amounts of frequency variation identifying one of said last-mentioned resultant phase vectors;

and a receiver including means for receiving said frequency varying carrier signal;

means for translating said received carrier signal into an intermediate frequency signal represented by a plurality of other phase vectors occupying angular positions between predetermined rectilineal coordinate axes in correspondence with said angular positions of said further signal resultant phase vectors between said first-mentioned coordinate axes so that each of said intermediate frequency signal phase vectors represents one of said voltage code elements;

a second oscillator for producing a signal reference phase;

first phase detecting means for converting a first portion of said second reference phase signal and a first portion of said intermediate frequency signal represented by each of said other phase vectors in turn into a first series of discrete voltages having predetermined polarities;

second phase detecting means for converting a second portion of said second reference phase signal delayed by 90° from said last-mentioned first portion of said second reference phase signal and a second portion of said intermediate frequency signal represented by each of said last-mentioned other phase vectors in turn into a second series of discrete voltages having predetermined polarities and corresponding in time with said first voltage signal series so that a combination of one voltage of the successive voltages of said first voltage series and a corresponding one voltage of the successive voltages of said second voltage series represents each of the intermediate frequency signal other phase vectors in turn in correspondence with said transmitter further signal resultant phase vectors in turn;

means for translating each of said last-mentioned one voltage combinations in turn into an additional voltage of predetermined value to represent each of said intermediate frequency signal other phase vectors in turn and thereby each of said preselected voltage code elements in turn so that said additional voltages of predetermined values constitute a voltage code corresponding with said transmitter preselected voltage code;

and clock means for translating said last-mentioned additional voltage code into other information signals corresponding with said first-mentioned information signals.

13. A phase shift modulator for a carrier communication transmitter comprising:

means for producing a multi-element signal code comprising a preselected number of discrete voltages of predetermined values, each predetermined voltage value identifying one code element;

means activated by each of said code element voltages in turn to provide a series of pairs of discrete control voltages of which each control voltage pair identifies one of said code elements and each control voltage of each pair of control voltages has a predetermined polarity;

means for generating a signal of reference phase;

first modulating means activated by one control voltage of the successive pairs of said series of pairs of control voltages and a first portion of said reference phase signal to produce a first phase shifted signal represented by a plurality of phase vector occupying angular positions coincident with a predetermined one of two rectilineal coordinate axes as fixed by the polarity of the last-mentioned one control voltage of the successive pairs of said first control voltage series;

second modulating means activated by a second control voltage of the successive pairs of said series of control voltages, said one and second control voltages forming the same pair in said respective pairs of control voltages, and a second portion of said reference phase signal delayed by 90° from said first portion of said reference signal to produce a second phase shifted voltage represented by a plurality of phase vectors occupying angular positions coincident with a predetermined other axis of said two coordinate axes as fixed by the polarity of said last-mentioned second control voltage of the successive pairs of said first control voltage series;

means for combining said first and second phase shifted signals derived at the same time from said one and second control voltages of each of said control voltage pairs in turn and represented by phase vectors separated by 90° to produce a further voltage signal represented by resultant phase vectors occupying angular positions between said predetermined one and other axes of said coordinate axes and representing said preselected voltage code elements;

and means for translating said further voltage signal represented by said resultant phase vectors into transmission signals.

14. A phase shift detector for a first code signal varying a preselected characteristic in predetermined amounts in response to a second code signal represented by a plurality of phase vectors occupying angular positions between predetermined rectilineal coordinate axes, each of said second code signal phase vectors representing one of said first code signal predetermined characteristic amounts and thereby one element of a multi-element voltage code, comprising:

means for converting said first code signal into an intermediate frequency signal represented by a plurality of other phase vectors occupying angular positions between predetermined rectilineal coordinate axes in correspondence with said angular positions of said second code signal phase vectors between said first-mentioned coordinate axes;

means for generating a signal of reference phase;

first phase detecting means for converting a first portion of said reference signal and a first portion of said intermediate frequency signal represented by each of said other phase vectors in turn into a first series of discrete voltages having predetermined polarities;

second phase detecting means for converting a second portion of said reference phase signal, delayed by 90° from said last-mentioned first portion of said reference phase signal, and a second portion of said intermediate frequency signal represented by each of said other phase vectors in turn into a second series of discrete voltage signals having predetermined polarities and corresponding in time with said first voltage signal series so that a combination of one voltage of the successive voltages of said first voltage series and a corresponding one voltage of the successive voltages of said second voltage series represents each of said intermediate frequency signal other phase vectors in turn in correspondence with each of said second signal code phase vectors in turn;

and means for translating each of said last-mentioned one voltage combinations in turn into transmission signals.

15. A phase shift radio communication transmitter, comprising:

a supply of information signals;

means for translating said information signals into a multi-element signal voltage code consisting of a preselected number of discrete voltage elements having predetermined values, each voltage value representing one code element;

a local generator of a signal having a preselected frequency and reference phase;

a tuned amplifier circuit for shifting the phase of said local signal in discrete predetermined amounts in response to said respective voltage code elements, including a transistor having a base coupled to said local generator, an emitter coupled to ground, and a collector;

a fixed inductance and capacity network having one terminal connected to a positive terminal of a source of direct current voltage and an intermediate terminal connected to said transistor collector;

and a variable capacity diode having an anode connected to an opposite end terminal of said network and a cathode coupled to said voltage code means and ground, said diode having a certain capacity to tune said amplifier circuit to transmit said local signal at said preselected frequency and reference phase in the absence of signal voltage code elements at said diode and varying in capacity away from said certain capacity to vary the tuning of said amplifier circuit for shifting the phase of said local signal away from said reference phase in discrete predetermined amounts in response to the respective signal voltage code elements at said diode, each of said voltage code elements so activating said diode as to vary its capacity and thereby the tuning of said amplifier circuit for said local signal thereby shifting the phase of said local signal one of said predetermined amounts away from said local signal reference phase;

means for amplifying said local signal as derived from said tuned amplifier circuit at said reference and shifted phase and supplying said last-mentioned amplified local signal to an output;

and means having a predetermined frequency multiplication factor and deriving said amplified local signal at said reference and shifted phase from said amplifying means output for transmitting said last-mentioned local signal in the form of a carrier signal provided with a frequency equal to the preselected frequency of said local signal multiplied by said multiplication factor.

References Cited

UNITED STATES PATENTS

| | | | |
|---|---|---|---|
| 2,977,417 | 3/1961 | Doelz | 178—66 |
| 3,128,342 | 4/1964 | Baker | 178—66 |
| 3,131,363 | 4/1964 | Londee et al. | 340—170 |
| 3,183,442 | 5/1965 | Filipowsky | 178—66 |
| 3,230,310 | 1/1966 | Brogle | 178—66 |

JOHN W. CALDWELL, *Acting Primary Examiner.*

R. L. GRIFFIN, *Examiner.*

UNITED STATES PATENT OFFICE

CERTIFICATE OF CORRECTION

Patent No. 3,349,181 October 24, 1967

Sukehiro Ito

It is hereby certified that error appears in the above numbered patent requiring correction and that the said Letters Patent should read as corrected below.

Column 3, line 35, for "quatizer" read -- quantizer --; column 4, line 2, for "IF" read -- I-f --; column 6, line 1, for "nad" read -- and --; column 7, line 63, for "phase-shifted" read -- phase-shift --; column 10, line 53 and column 11, line 3, for "turned", each occurrence, read -- tuned --; column 13, line 55, for the claim reference numeral "3" read -- 4 --.

Signed and sealed this 12th day of November 1968.

(SEAL)
Attest:

Edward M. Fletcher, Jr.
Attesting Officer

EDWARD J. BRENNER
Commissioner of Patents